United States Patent
Fang et al.

(10) Patent No.: US 11,782,285 B2
(45) Date of Patent: Oct. 10, 2023

(54) MATERIAL IDENTIFICATION METHOD AND DEVICE BASED ON LASER SPECKLE AND MODAL FUSION

(71) Applicant: TSINGHUA UNIVERSITY, Beijing (CN)

(72) Inventors: Lu Fang, Beijing (CN); Mengqi Ji, Beijing (CN); Shi Mao, Beijing (CN); Qionghai Dai, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 414 days.

(21) Appl. No.: 17/036,475

(22) Filed: Sep. 29, 2020

(65) Prior Publication Data

US 2021/0118123 A1 Apr. 22, 2021

(30) Foreign Application Priority Data

Oct. 22, 2019 (CN) .......................... 201911005215.1

(51) Int. Cl.
*G06T 7/00* (2017.01)
*G02B 27/48* (2006.01)
(Continued)

(52) U.S. Cl.
CPC ............ *G02B 27/48* (2013.01); *G01N 21/39* (2013.01); *G06F 18/214* (2023.01);
(Continued)

(58) Field of Classification Search
None
See application file for complete search history.

(56) References Cited

U.S. PATENT DOCUMENTS

2013/0229499 A1* 9/2013 Zhao ................ G01B 11/24
348/51
2020/0042822 A1* 2/2020 Chae ................ G01N 21/251
2020/0050902 A1* 2/2020 Choi ................ G06K 9/6293

FOREIGN PATENT DOCUMENTS

CN 109117746 A * 1/2019 ......... G06K 9/00375

OTHER PUBLICATIONS

Mao, Shi, et al. "Surface material perception through multimodal learning." IEEE Journal of Selected Topics in Signal Processing 16.4 (2022): 843-853. (Year: 2022).*
Yuan, Wenzhen, et al. "Connecting look and feel: Associating the visual and tactile properties of physical materials." Proceedings of the IEEE Conference on Computer Vision and Pattern Recognition. 2017. (Year: 2017).*
(Continued)

*Primary Examiner* — Sean M Conner
(74) *Attorney, Agent, or Firm* — David D. Brush; Westman, Champlin & Koehler, P.A.

(57) ABSTRACT

The present disclosure provides a material identification method and a device based on laser speckle and modal fusion, an electronic device and a non-transitory computer readable storage medium. The method includes: performing data acquisition on an object by using a structured light camera to obtain a color modal image, a depth modal image and an infrared modal image; preprocessing the color modal image, the depth modal image and the infrared modal image; and inputting the color modal image, the depth modal image and the infrared modal image preprocessed into a preset depth neural network for training, to learn a material characteristic from a speckle structure and a coupling relation between color modal and depth modal, to generate a material classification model for classifying materials, and to generate a material prediction result in testing by the material classification model of the object.

12 Claims, 4 Drawing Sheets performing data acquisition on an object using a structured light camera for projecting laser speckles to obtain a color modal image, a depth modal image and an infrared modal image — 101 preprocessing the color modal image, the depth modal image and the infrared modal image — 102 inputting the preprocessed color modal image, the depth modal image and the infrared modal image into a preset depth neural network for training, to learn a material characteristic from a speckle structure and a coupling relation between color modal and depth modal, to generate a material classification model for classifying materials, and to generate a material prediction result in testing by the material classification model — 103

(51) Int. Cl.

| | |
|---|---|
| *G01N 21/39* | (2006.01) |
| *G06T 5/00* | (2006.01) |
| *G06F 18/214* | (2023.01) |
| *G06F 18/25* | (2023.01) |
| *G06V 10/56* | (2022.01) |
| *G06V 10/764* | (2022.01) |
| *G06V 10/774* | (2022.01) |
| *G06V 10/80* | (2022.01) |
| *G06V 10/82* | (2022.01) |
| *G06V 10/60* | (2022.01) |
| *G06V 10/143* | (2022.01) |

(52) U.S. Cl.
CPC ............ *G06F 18/251* (2023.01); *G06T 5/009* (2013.01); *G06T 7/0004* (2013.01); *G06V 10/143* (2022.01); *G06V 10/56* (2022.01); *G06V 10/60* (2022.01); *G06V 10/764* (2022.01); *G06V 10/774* (2022.01); *G06V 10/803* (2022.01); *G06V 10/82* (2022.01); *G06T 2207/10024* (2013.01); *G06T 2207/10028* (2013.01); *G06T 2207/10048* (2013.01); *G06T 2207/20081* (2013.01); *G06T 2207/20084* (2013.01)

(56) References Cited

OTHER PUBLICATIONS

Cruz, Leandro, Djalma Lucio, and Luiz Velho. "Kinect and rgbd images: Challenges and applications." 2012 25th SIBGRAPI conference on graphics, patterns and images tutorials. IEEE, 2012. (Year: 2012).*
Dachsbacher, Carsten, and Marc Stamminger. "Translucent shadow maps." Rendering Techniques 2003 (2003): 197-201. (Year: 2003).*
Almasri, Feras, and Olivier Debeir. "Multimodal sensor fusion in single thermal image super-resolution." Computer Vision—ACCV 2018 Workshops: 14th Asian Conference on Computer Vision, Perth, Australia, Dec. 2-6, 2018, Revised Selected Papers 14. Springer International Publishing, 2019. (Year: 2019).*
First Chinese Office Action dated Apr. 28, 2022 for corresponding Chinese Application No. 201911005215.1, filed Oct. 22, 2019.
Zhao C. et al., "A fully end-to-end deep learning approach for real-time simultaneous 3D reconstruction and material recognition", Proceedings of the 2017 18th International Conference on Advanced Robotics (ICAR), Hong Kong, China, Jul. 2017.
Feng W. et al., "Feature extraction and recognition of laser speckle for special material surface", vol. 36, No. 2., Apr. 30, 2007.
Liu H. et al., "Study on classification and recognition of materials based on convolutional neural network", vol. 47, No. 8, Aug. 31, 2017.

* cited by examiner 101 performing data acquisition on an object using a structured light camera for projecting laser speckles to obtain a color modal image, a depth modal image and an infrared modal image 102 preprocessing the color modal image, the depth modal image and the infrared modal image 103 inputting the preprocessed color modal image, the depth modal image and the infrared modal image into a preset depth neural network for training, to learn a material characteristic from a speckle structure and a coupling relation between color modal and depth modal, to generate a material classification model for classifying materials, and to generate a material prediction result in testing by the material classification model

FIG. 1

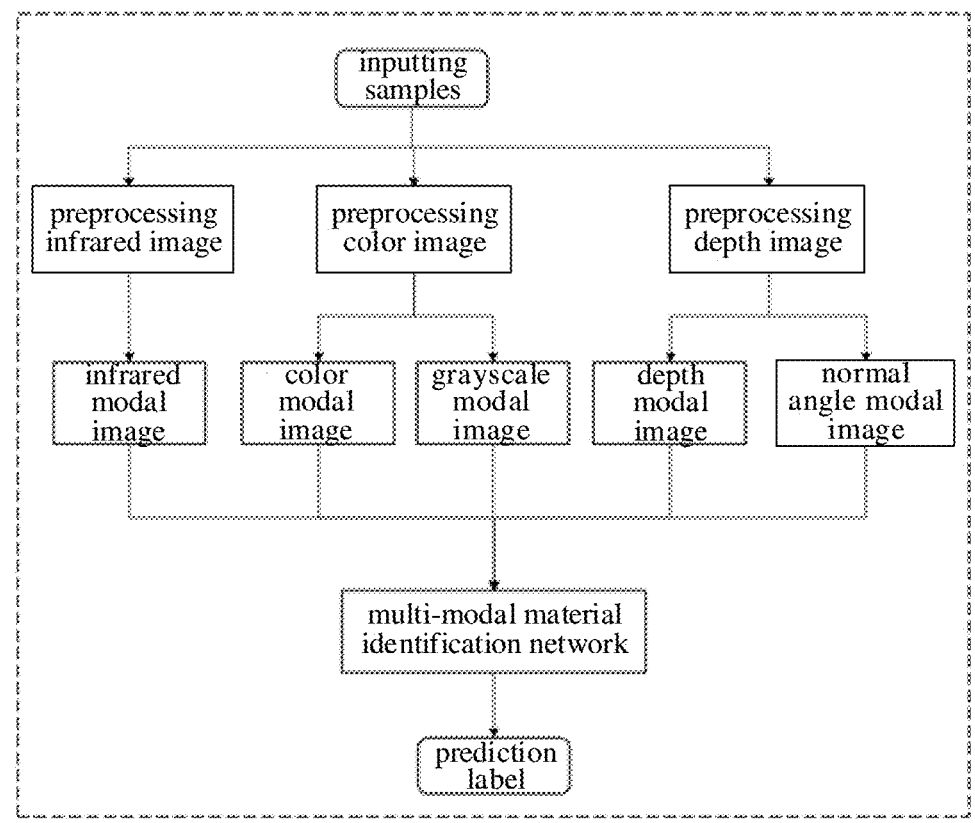

FIG. 2

MATERIAL IDENTIFICATION METHOD AND DEVICE BASED ON LASER SPECKLE AND MODAL FUSION

CROSS REFERENCE TO RELATED APPLICATIONS

This application claims priority and benefits to Chinese Application No. 201911005215.1, filed on Oct. 22, 2019, the entire content of which is incorporated herein by reference.

TECHNICAL FIELD

The present disclosure relates to the fields of optical laser speckle imaging, computer vision, deep learning and material identification technologies, and more particularly, to a material identification method and device based on laser speckle and modal fusion.

BACKGROUND

Materials may constitute a wide variety of objects. Common materials include wood, plastic, paper, rubber, and fiber. In the environmental protection industry, there is a saying that "garbage is a misplaced resource". Reasonable material identification can realize effective use of resources. In industrial production, material identification can realize anomaly detection and discover production problems in advance. In the academic world, material identification can help robots better understand surrounding environment. Based on the requirements in the above fields, it is necessary to study the material identification of object.

SUMMARY

Embodiments of the present disclosure provide a material identification method based on laser speckle and modal fusion. The method includes: performing data acquisition on an object using a structured light camera for projecting laser speckles to obtain a color modal image, a depth modal image and an infrared modal image; preprocessing the color modal image, the depth modal image and the infrared modal image; and inputting the color modal image, the depth modal image and the infrared modal image after the preprocessing into a preset depth neural network to training the preset depth neural network with data acquired, to learn material characteristics from a speckle structure and a coupling relation between color modal and depth modal, to generate a material classification model for classifying materials, and to generate a material prediction result in testing by the material classification model.

Embodiments of the present disclosure provide an electronic device. The electronic device includes a processor and a memory, having a computer program stored thereon. When the computer program is executed by the processor, the processor is configured to execute the method described above.

Embodiments of the present disclosure provide a non-transitory computer readable storage medium, having one or more computer programs stored thereon. When the one or more computer programs are executed by a processor, the method described above is executed.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which:

FIG. 1 is a flowchart illustrating a material identification method based on laser speckle and modal fusion according to embodiments of the present disclosure.

FIG. 2 is a flowchart illustrating a material identification method based on laser speckle and modal fusion, according to embodiments of the present disclosure.

DETAILED DESCRIPTION

Figure 3:
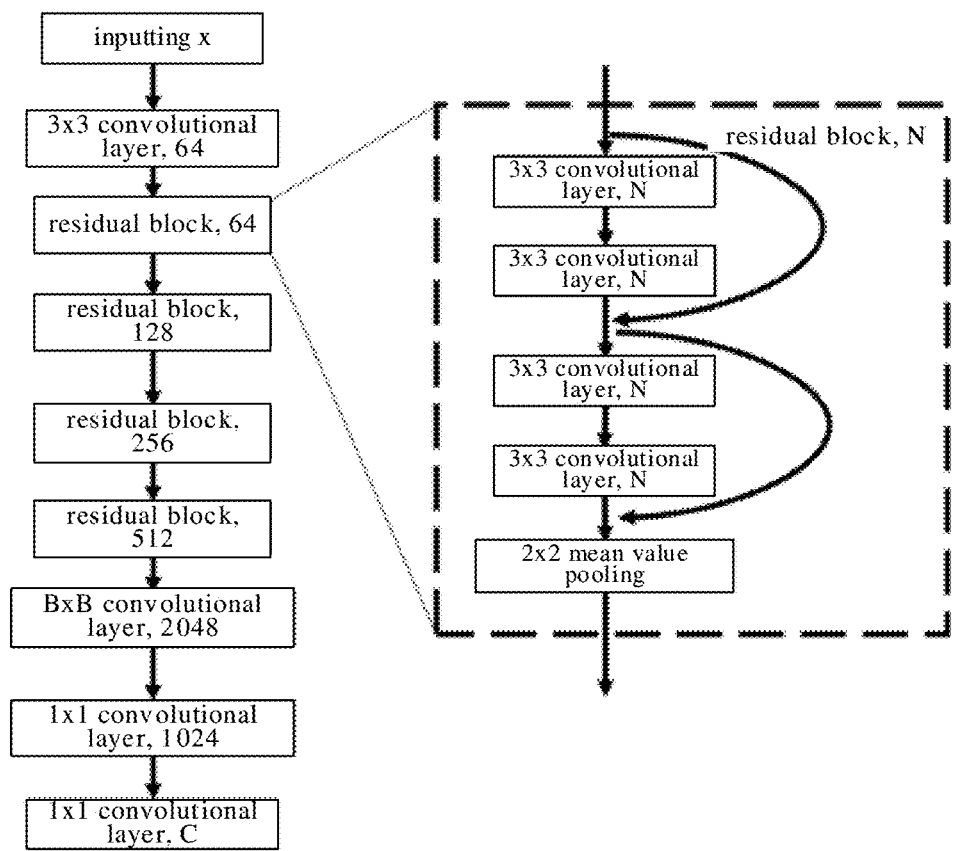
FIG. 3 is a diagram illustrating a deep neural network according to embodiments of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

The Applicants have observed that, it is necessary to study the material identification of object.

An existing method is to use information of color, texture and roughness of the object in a visible band to perform the material identification. However, this method is not robust enough in a scene of complex ambient light. For example, robustness may be affected due to changes in brightness of the ambient light from right to dark or changes in color temperature of the ambient light from warm to cool. In another example, the robustness may be affected due to change in texture scale caused by changes in object distance.

In addition, researchers have attempted to study the material identification in an infrared band, using Raman light or using non-optical signals, such as ultrasonic and tactile signals. Currently, many methods of material classification of an object are disclosed. For example, a method of material classification based on joint sparse coding of sensitive hand tactile information is available, as well as a method of material classification based on multi-modal fusion deep learning. The former uses tactile sequences and does not use multi-modal information of the material. The latter studies complementary information of vision and tactile sense to perform the material classification. However, non-contact visual information is easy to be obtained than tactile contact information. The material identification based on interaction between laser speckles and the material, as well as modal fusion with visible vision is still a challenge.

Therefore, embodiments of the present disclosure provide a material identification method and a material identification device based on laser speckle and modal fusion, to realize the material identification by using the interaction between the laser speckle and the material, as well as the modal fusion with visible vision, which is simple and easy.

A material identification method and a material identification device based on laser speckle and modal fusion according to embodiments of the present disclosure are described below with reference to the accompanying drawings.

FIG. 1 is a flowchart illustrating a material identification method based on laser speckle and modal fusion according to embodiments of the present disclosure.

As illustrated in FIG. 1, the material identification method based on laser speckle and modal fusion may include the following.

At block 101, data acquisition is performed on an object using a structured light camera for projecting laser speckles, to obtain a color modal image, a depth modal image and an infrared modal image.

It can be understood that the structured light camera (e.g. Xtion camera) for projecting laser speckles may be configured to acquire data of the object, and the color modal image, the depth modal image and the infrared modal image may be obtained.

It should be noted that the method according to embodiments of the present disclosure may include a multi-modal data acquisition phase, a data pre-processing phase, a deep network training phase, and a testing phase.

In detail, in the multi-modal data acquisition phase, the structured light camera for projecting laser speckles may be configured to acquire multi-modal data.

For m objects formed of different materials respectively, the structured light camera for projecting laser speckles may be configured to perform the data acquisition on each object at different distances and in different postures of the camera respectively to obtain 32 sets of data. During each data acquisition, 10 infrared images that are continuously exposed (having a resolution of 1280×1024), 6 color images (having a resolution of 1280×1024×3) that are continuously exposed at different exposure times, and one depth image (having a resolution of 320×240) are obtained. That is, during each data acquisition, 17 raw images are obtained.

The 32 sets of data are collected for each object. The 32 sets of data acquired for each object include data acquired at different distances and data acquired at different shooting angles. As illustrated in FIG. 2, for example, 4 distances and 3 different postures of the camera may be included. The object is sampled repeatedly to obtain 32 sets of data for training. As illustrated in FIG. 3, the 4 distances may include a distance range from 1 m to 1.5 m, a distance range from 1.5 m to 2 m, a distance range from 2 m to 2.5 m, and a distance range from 2.5 m to 3 m, covering most of intended depth range (0.8-3.5 m). The 3 postures of camera may include a left posture, a middle posture, and a right posture. The object is sampled for three time at the left posture and the right posture respectively, and for twice at the middle posture, to allow that a large depth range may be covered with less samplings (the depth range corresponding to the left posture and the right posture is larger than the depth range corresponding to the middle posture), and to allow that a peak of the depth does not appear within the distance ranges. Generally, two sets of data acquired by fully sampling the object may be used as a training set and a verification set respectively, and a set of data acquired by partly sampling the object that does not include data acquired at the middle posture as a test set. That is, the training set and the verification set may respectively include 12 sets of data that equals to a product of the number of 4 distances and the number of 3 postures, while the test set may include 8 sets of data that equals to a product of the number of 4 distances and the number of 2 postures.

During the data acquisition, in the visible light wavelength, the projector is configured to project monochromatic light with varying color onto ceiling in an indoor environment. Color temperature of the indoor environment may be changed by light scattered via the ceiling. This introduces a certain change to the color image and prevents the material data from overfitting to a specific color. On the other hand, for studying influences of light intensity, 6 exposure levels may be set for the color camera, including −2 exposure level, −1 exposure level, 0 exposure level, 1 exposure level, 2 exposure level and 3 exposure level. Each exposure level has exposure time of (n+3)×100 μs respectively, where n is the exposure level. The 0 exposure level may be set as a normal exposure.

The 10 infrared images may be used to determine whether the object is static. In a case where the object is not static, due to the coherence phenomenon, the phase difference may be inconstant and the coherence condition may be not satisfied. Therefore, the speckle structure formed under a case where the object moves at a small scale may be differ from the speckle structure formed under a case where the object is static.

At block 102, the color modal image, the depth modal image and the infrared modal image are pre-processed.

In some examples, pre-processing the color modal image, the depth modal image and the infrared modal image may include: transforming the color modal image to a coordinate system corresponding to the infrared modal image and the depth modal image; using the depth modal image and a preset illumination mode to obtain an approximate angle between a surface normal vector of the object and incident ray; and performing normalization on an image on each channel.

It can be understood that pre-processing the data acquired may include: transforming the color image to the coordinate system corresponding to the infrared image and the depth image; using the depth image and the preset illumination mode to obtain the approximate angle (i.e., a normal angle) between the surface normal vector of the object and the incident ray; and performing the normalization on the image of each channel.

In detail, the data preprocessing phase may include a depth image preprocessing phase, a color image preprocessing phase, a normal angle calculation phase, and a normalization phase.

The color image preprocessing phase may be described below. Subscripts "ir" and "rgb" are used to indicate the coordinate system of the infrared camera and the coordinate system of the color camera respectively. Since the depth camera and the color camera are located closely to each other and may be regarded as a calibrated binocular system, it may be considered that $Z_{ir} \approx Z_{rgb}$. Therefore, the coordinate transformation between the color camera and the infrared camera may be given by:

$$\begin{bmatrix} u_{rgb} \\ v_{rgb} \\ 1 \\ \frac{1}{Z_{rgb}} \end{bmatrix} = K_{rgb}^{\%} M_{ir}^{\%-1} \begin{bmatrix} u_{ir} \\ v_{ir} \\ 1 \\ \frac{1}{Z_{ir}} \end{bmatrix} = M^{\%} \begin{bmatrix} u_{ir} \\ v_{ir} \\ 1 \\ \frac{1}{Z_{ir}} \end{bmatrix}$$

where, $K_{ir}^{\%}$ represents an augmented internal reference matrix of the infrared camera and $K_{rgb}^{\%}$ represents an augmented internal reference matrix of the color camera, M represents a homogeneous transformation matrix between the infrared camera and the color camera, u and v represents pixel coordinates in the image coordinate system respectively. The transformation matrix may be obtained by fitting the point-pair relation between the infrared image and the color image obtained from a camera interface with a linear fitting method. A backward mapping of bilinear interpolation may be performed on the color image in the infrared image space with the transformation matrix to obtain color image of the same size in the infrared image space, to realize one-to-one pixel matching. Therefore, a three-channel color modal image is obtained.

For example, an average is performed on channels of the color modal image (the number of channels is 3) to obtain a grayscale modal image (the number of channels is 1).

The depth image preprocessing may be described below. The raw depth image having the resolution of 320×240 and a data format of uint 16 is converted into the data format of float. The depth image may be preprocessed in two manners: a range normalization manner and an inverse-square manner. The threshold normalization manner is to divide the depth data by a maximum threshold (here, a farthest distance 3000 mm) to obtain the normalized depth within the range of [0, 1], i.e., $$d_{norm}=d_{new}/3000.$$

where, $d_{norm}$ represents the normalized depth, and $d_{raw}$ represents the raw depth.

The inverse-square manner is to obtain an inverse-squared depth of the normalized depth. For example, for invalid pixels that it is unable to calculate the depth due to occlusion of infrared light, mirror reflection, full absorption and excessive intensity of external light in the infrared band, the normalized depth is 0, which may be mapped as −0.5 to differentiate amongst invalid pixels and valid pixels. A nearest distance (about 1 m) may be mapped as 1 to allow the normalized depth to be within [0, 1). That is, this normalization operation may be formulated as follows:

$$d_{invs} = \begin{cases} \left(\frac{1000}{d_{raw}}\right)^2 & d_{raw} \neq 0 \\ -0.5 & d_{raw} = 0 \end{cases}$$

where, $d_{invs}$ represents inverse-squared depth.

The pre-processed depth image may be up-sampled (bilinear interpolation) to obtain an image of a size of 1280×960 to form one-to-one pixel matching with a corresponding region of the infrared channel (an upper part of the image). Therefore, the depth modal image is obtained.

The normal angle calculation phase will be described below. The depth image is transformed from a pixel coordinate system to a camera coordinate system using internal parameters. The normal vector may be calculated from the depth image using a following equation:

$$n = n_{XZ} \times n_{YZ} = \left[-\frac{dZ}{dX}, -\frac{dZ}{dY}, 1\right]^T$$

where, X, Y and Z are coordinates of the camera coordinate system, $n_{XZ}$ represents a normal vector of XZ plane, and $n_{YZ}$ represents a normal vector of YZ plane.

On the depth image, a sobel differential operator having differential and smooth filtering functions may be used to obtain dZ/du and dZ/dv respectively. The differential values in the spatial coordinate system may be obtained based on an actual size corresponding to the pixel.

An angle of incident light is approximately same to an angle of exiting light in an application scene. Therefore, the direction of the incident light may be estimated based on the direction of the exiting light according to a following equation:

$$\omega_i \approx \omega_o \approx \begin{bmatrix} X/f \\ Y/f \\ 1 \end{bmatrix} = \begin{bmatrix} \frac{dx}{f} & 0 & \frac{u_0 dx}{f} \\ 0 & \frac{dy}{f} & \frac{v_0 dy}{f} \\ 0 & 0 & 1 \end{bmatrix} \begin{bmatrix} u \\ v \\ 1 \end{bmatrix},$$

where, f is a focal length of the camera, dx and dy represent actual sizes of a pixel of an imaging element of the camera, and $u_0$ and $v_0$ represent offsets of the camera center and may be given by the internal parameters of the camera. The normal angle is the normalized inner product of the incident light and the normal vector, which is given by:

$$\theta = \frac{n \cdot \omega_i}{\sqrt{\|n\|_2 \|\omega_i\|_2}},$$

where, θ represents the normal angle, $\|\cdot\|_2$ represents a 2-norm. The calculated normal angle image is up-sampled to obtain a full-size normal angle modal image.

The infrared image preprocessing phase will be described below. The raw infrared image is data of 16-bit unit format and the lower 10 bits are valid. The raw infrared image is divided by 1024 (normalization process) to obtain a normalized infrared modal image.

The infrared modal image, the depth modal image, the normal angle modal image, and the color modal image (three channels) are stacked to form a sample data map of a size of 1280×960 pixels. In addition, a seventh binarization mask channel is manually marked to indicate a region of the object in the image, and the background is excluded.

At block 103, the color modal image, the depth modal image and the infrared modal image after the preprocessing are input into a preset depth neural network and the preset depth neural network is trained using the acquired sets of data, to learn material characteristics from a speckle structure and coupling relation between the color modal image and depth modal image, to generate a material classification model for material classification, and to generate a material prediction result in testing by the material classification model.

It can be understood that the acquired data may be input into the deep neural network, and the deep neural network is trained based on the acquired sets of data, to learn material characteristics from the speckle structure and a coupling relation between the color modal and the depth modal, to obtain the network model for material classification, and to generate a material prediction result in the testing.

For exampling, training the deep neural network may relate to data loading and the structure of the deep neural network and may include the following.

Data loading will be described below. The above sample data images (including the color modal image, the depth modal image and the infrared modal image) are sampled. A window having a size of W×W×I is randomly selected from an effective region satisfying the mask, where I is the number of channels of a combination of certain modal. The maximum of I may be 6, which may uniquely represent a full-modal image obtained by combining the infrared modal, the depth modal, normal angle modal and color modal. The minimum of I may be 1, which may represent an infrared image or a grayscale image. The acquired data is inputted into the network for training. To improve generalization performance of the model, data enhancement including color brightness, contrast, random variation of saturation, random rotation and flipping may be introduced. An obtained data map having the dimension of W×W×I may be indicated by x.

The data map x is input into the neural network as illustrated in FIG. 3. Basic structure of the network includes convolutional layers and residual blocks composed of the convolutional layers and jumpers. Unless stated otherwise, a stride of the convolutional layer may be 1 and a padding manner of the convolutional layer may be 1 pixel padding surrounding the convolutional layer with a value of 0. Except the output layer, batch normalization may be introduced in each convolutional layer and a rectified linear unit (Relu) is used. Parameters illustrated in FIG. 3 indicate the size W×W of the convolution kernel and the number N of convolution kernels.

The input is subjected to feature extraction via a 3×3 convolutional layer, and passes through four residual blocks that are gradually deepened in dimension but gradually reduced in size. Decrease of a size of an output is mainly caused by 2×2 mean value pooling at the end of the residual block. The pooling layer has the stride of 2 and the size of the output is thus reduced by half. After the output from the residual network passes through one convolutional layer, the size of output from the convolutional layer is limited to 1×1. After the output from the convolutional layer passes through two convolutional layer having the convolution kernel with a size of 1×1, instead of a full-connection layer, a classification output having a dimension that equals to the number of classified materials is outputted.

For example, at the input layer, I may represent the number of dimensions contained in the input modal. The input modal may be a model containing a type of modal fusion. A combination of all modal described above or a combination of a part of modal described above may be used as the network input. Since the acquired sets of data may contain different modal such as infrared modal, color modal, depth modal and normal vector modal, differences and the coupling relations amongst the modal may be studied by training the network with various information. The size B×B of the convolution kernel of a first convolutional layer after the residual network may be adjusted based on a size of the input data. In a case where the size of the input data is W×W, the size of the convolution kernel may be set as W // 16. The parameter C illustrated at the output layer may represent a total number of object types.

For example, the material classification model based on the modal fusion may be obtained by training a network using a cross entropy as a loss function and by means of small batch gradient descent.

Further, in an example of the present disclosure, the method according to embodiments of the present disclosure may further include: performing material identification with an optical signal and distinguishing objects by a rendering model based on reflection and scattering characteristics of light on different object surfaces.

In an example, a feasible way of using the optical signal for material identification is to use the reflection and scattering characteristics of light on different object surfaces to distinguish objects. Since different objects may have different subsurface reflection characteristic as well as different scattering and reflection characteristics, responses of different objects to incident light are different in aspects of time, space, and exiting angle. The rendering model in computer graphics gives formulated representation of the scattering characteristic in cases of different surfaces. For example, the scattering characteristic may be described by a bidirectional scattering surface reflectance distribution function (BSSRDF). The BSSRDF may be configured to describe a relation between luminous fluxes of a pair of exiting light and incident light, including subsurface reflections. The BSSRDF may be regarded as a generalized form of a simply bidirectional reflection distribution function (BRDF). In an example, for coherent light with a fixed wavelength and a fixed phase difference, the reflected wave may be affected by the coherence phenomenon.

The BRDF model may be used in the rendering model of computer graphics. In practice, spatial information and time information of the object and the wavelength information of the light should also be given. Considering non-illuminating objects, the rendering model may be expressed as:

$$L_o(x,\omega_o,\lambda,t) = \int_\Omega f_r(x,\omega_i,\omega_o,\lambda,t) L_i(x,\omega_i,\lambda,t)(\omega_i,n) d\omega_i,$$

where, $L_o(x,\omega_o,\lambda,t)$ represents radiant luminance of light having a wavelength $\lambda$ exiting from a surface point x of the object along an exit direction $\omega_o$ at time t, which is an amount of energy, represented by the image, received by pixels corresponding to exiting ray. This radiant luminance is obtained by applying spherical integral on a function using an incident angle as an independent variable based on the surface point x of the object. $L_i(x,\omega_i,\lambda,t)$ represents the radiant luminance of light having the wavelength $\lambda$ incoming from the surface point x of the object along an incident direction $\omega_i$ at time t, $f_r(x,\omega_i,\omega_o,\lambda,t)$ is a generalized BRDF model describing the scattering characteristic of the object and represents, at time t, a ratio of light exiting from the surface point x along the exit direction $\omega_o$ to the light having the wavelength $\lambda$ that incomes along the incident direction $\omega_i$, and $(\omega_i, n)$ represents an inner product of the incident direction $\omega_i$ and a normal vector n of the surface point x of the object.

Information about the material of the object in general problems of interest is included in the function $f_r(x,\omega_i,\omega_o,\lambda,t)$. This function $f_r(x,\omega_i,\omega_o,\lambda,t)$ is related to the geometry and material properties of the object, which can be described by the BRDF modeling. Therefore, with this simplified model, the material identification of the object may be described as the inverse of a rendering problem. That is, the reflection characteristic ($f_r$) of the object may be identified by the acquired image ($L_o$ relevant). For natural color images in an imaging system, ambient light ($\omega_i$ relevant) may be unknown and the surface three-dimensional position x and the normal vector n of the object may be lost in the projection imaging system. From the perspective of model analysis, it is unfavorable to solve the inverse of the rendering problem. However, with the structured light camera, it is possible to use a relatively stable light source and a sensor with a band-pass filter, such that the discussed wavelength is single. That is, the incident light condition ($\omega_i$) is implicitly known. In addition, since the structured light camera is configured to calculate depth information, one more dimension information of the depth information may be obtained and the normal information may be obtained based on difference of the depth information. The above provides more information for solving the inverse of the rendering information. It may be reasonably inferred that combining the color image and the information obtained from the structured light camera allows the material identification of the object reliable.

Figure 4:
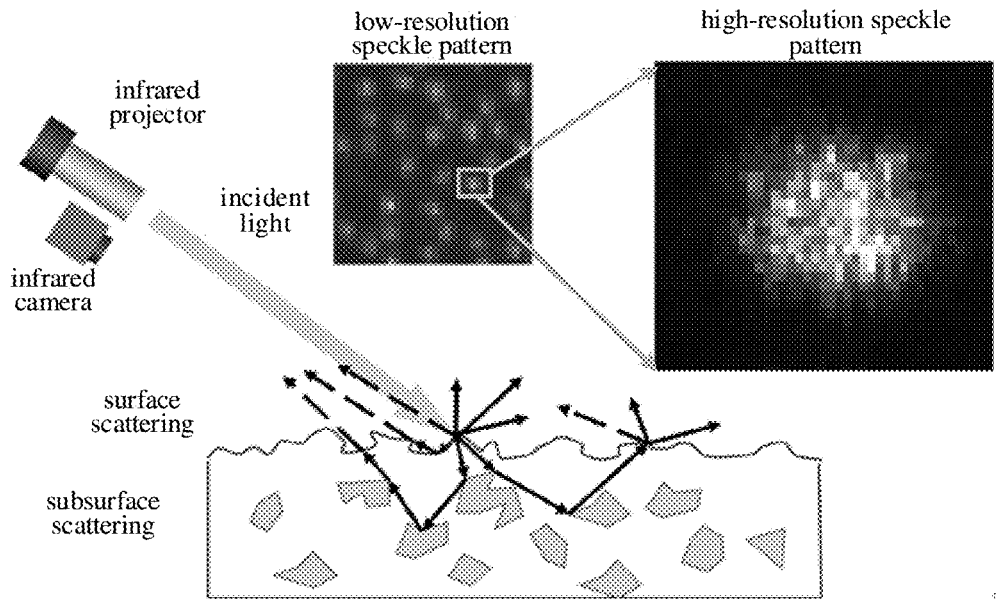
FIG. 4 is a schematic diagram illustrating a physical process of interaction between laser speckles and an object according to embodiments of the present disclosure.
Figure 5:
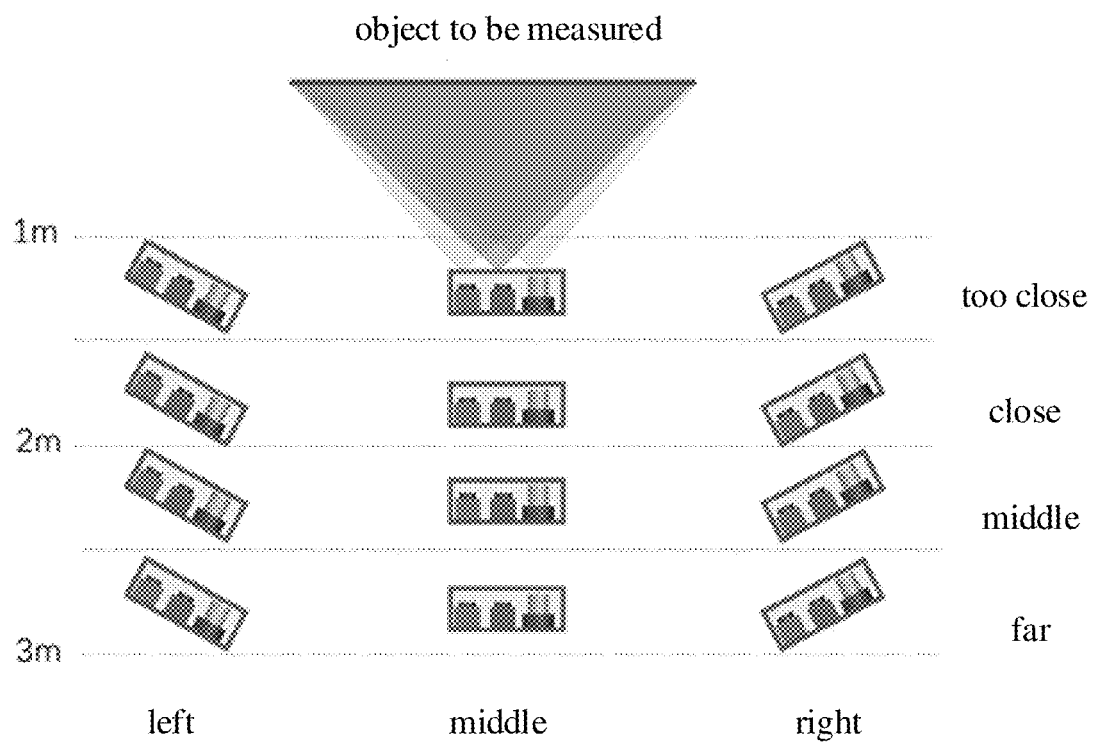
FIG. 5 is a schematic diagram illustrating a manner of data collection according to embodiments of the present disclosure.

Structured light camera scattering model will be described below. The laser light emitted by the structured light camera for projecting laser speckles may cause complicated reflection and scattering characteristics on the surface of the object formed of the material due to the property of stable wavelength. The observed speckle pattern is formed by coherent superposition of subsurface scattering (volume scattering) and surface scattering of the projected light on the surface of the object. Since the camera baseline (75 mm) is smaller than a distance from the object (1-3 m) and a difference of observation angles is small, the model may be further limited to that the incident direction is close to an observation direction. For oblique incidence, since specular reflection component is difficult to be detected, the observation of a specular object is limited. As illustrated in FIG. 4, as can be seen from an enlarged high-definition speckle pattern, the received speckle pattern is not in the form of a projected Gaussian bright spot and destructive interference and constructive interference exist in a central portion. Material classification of the object may be achieved with this information. Theoretically, the interference information of material coding may be obtained according to the speckle pattern of a spot. However, since the acquired speckle pattern has a low resolution, it may be considered to learn based on the manner of the small window image block and to infer the material of the object using more spots.

With the material identification method based on laser speckle and modal fusion according to embodiments of the present disclosure, a laser speckle image formed by interaction between spatial coherent light and microstructure on the surface of the material may encode material-level characteristics and can be used for real-time material identification with a high resolution. In addition, a performance of material identification may be improved by combining the color modal and the depth modal. The interaction between the laser speckle and the material, as well as the modal fusion with vision in visible light may be used to realize the material identification, which is simple and easy.

The material identification device based on laser speckle and modal fusion according to embodiments of the present disclosure will be described with reference to the accompany drawings.

Figure 6:
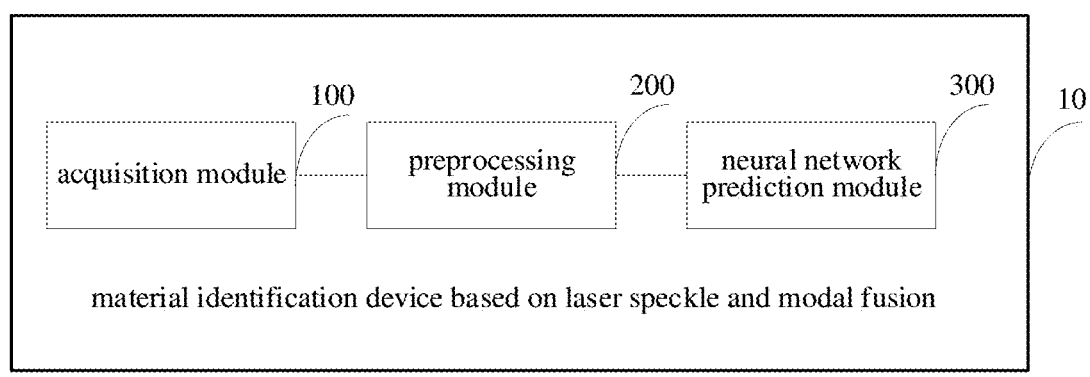
FIG. 6 is a schematic diagram illustrating a material identification device based on laser speckle and modal fusion according to embodiments of the present disclosure.

FIG. 6 is a schematic diagram illustrating a material identification device based on laser speckle and modal fusion according to embodiments of the present disclosure.

As illustrated in FIG. 6, the material identification device 10 based on laser speckle and modal fusion may include: an acquisition module 100, a preprocessing module 200, and a neural network prediction module 300.

The acquisition module 100 may be configured to perform data acquisition on an object using a structured light camera of projecting laser speckle, to obtain a color modal image, a depth modal image and an infrared modal image. The preprocessing module 200 may be configured to preprocess the color modal image, the depth modal image and the infrared modal image. The neural network prediction module 300 may be configured to input the color modal image, the depth modal image and the infrared modal image after the preprocessing into a preset depth neural network to train the preset depth neural network using the acquired sets of data, to learn material characteristics from a speckle structure and a coupling relation between the color modal image and the depth modal image, to generate a material classification model for material classification, and to generate a material prediction result in testing by the material classification model. The material identification device 10 according to embodiments of the present disclosure may realize material identification using the interaction between the laser speckle and the material, as well as the modal fusion with vision in visible light, which is simple and easy.

In addition, the preprocessing module 200 may be further configured to transform coordinates the color modal image to a coordinate system corresponding to the infrared modal image and the depth modal image; use the depth modal image and a preset illumination mode to obtain an approximate angle between a surface normal vector of the object and incident ray; and perform normalization on an image on each channel.

Furthermore, the device 10 may further include: an identification module, configured to perform the material identification using an optical signal. The objects may be distinguished by a rendering model based on reflection and scattering characteristics of light on different surfaces of objects.

In an example, the rendering model may be:

$$L_o(x,\omega_o,\lambda,t) = \int_\Omega f_r(x,\omega_i,\omega_o,\lambda,t) L_i(x,\omega_i,\lambda,t)(\omega_i,n) d\omega_i,$$

where, $L_o(x,\omega_o,\lambda,t)$ represents radiant luminance of light having a wavelength $\lambda$ exiting from surface point x of the object along an exit direction $\omega_o$ at time t, which is an amount of energy, represented by an image, received by pixels corresponding to exiting ray.

In an example, the neural network prediction module 300 may be configured to train a network by using a cross entropy as a loss function and by means of small batch gradient descent to obtain the material classification model based on the modal fusion.

It should be noted that the foregoing description of the embodiment of the material identification method based on laser speckle and modal fusion is also applicable to the material identification device based on laser speckle and modal fusion of the embodiment, and details are not described herein again.

With the material identification device based on laser speckle and modal fusion, a laser speckle image formed by interaction between spatial coherent light and microstructure on the surface of the material may encode material-level characteristics and can be used for real-time material identification with a high resolution. In addition, a performance of material identification may be improved by combining the color modal and the depth modal. The interaction between the laser speckle and the material, as well as the modal fusion with vision in visible light may be used to realize the material identification, which is simple and easy.

Figure 7:
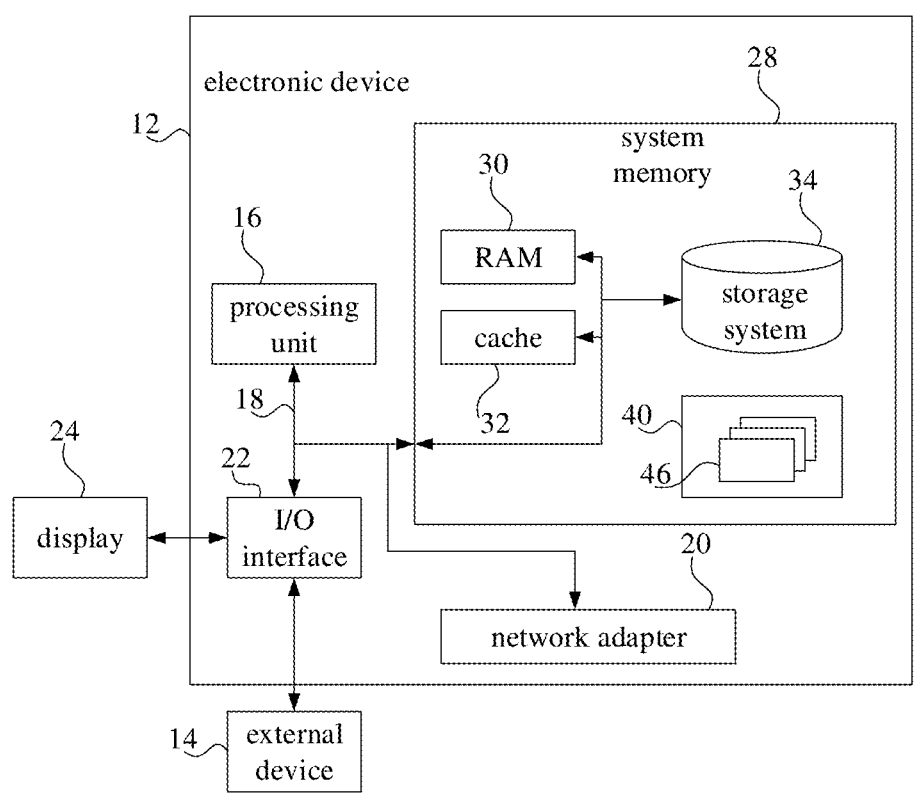
FIG. 7 is a block diagram illustrating an electronic device according to embodiments of the present disclosure.

FIG. 7 is a block diagram illustrating an electronic device according to embodiments of the present disclosure. The electronic device 12 illustrated in FIG. 7 is only illustrated as an example, and should not be considered as any restriction on the function and the usage range of embodiments of the present disclosure.

As illustrated in FIG. 7, the electronic device 12 is in the form of a general-purpose computing apparatus. The electronic device 12 may include, but is not limited to, one or more processors or processing units 16, a system memory 28, and a bus 18 connecting different system components (including the system memory 28 and the processing unit 16).

The bus 18 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronics standards association (VESA) local bus, and a peripheral component interconnect (PCI) bus.

Typically, the electronic device 12 may include multiple kinds of computer-readable media. These media may be any storage media accessible by the electronic device 12, including transitory or non-transitory storage medium and movable or unmovable storage medium.

The memory 28 may include a computer-readable medium in a form of volatile memory, such as a random access memory (RAM) 30 and/or a high-speed cache memory 32. The electronic device 12 may further include other transitory/non-transitory storage media and movable/unmovable storage media. In way of example only, the storage system 34 may be used to read and write non-removable, non-volatile magnetic media (not shown in the figure, commonly referred to as "hard disk drives"). Although not illustrated in FIG. 7 it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only Memory (DVD-ROM), or other optical media). In these cases, each driver may be connected to the bus 18 via one or more data medium interfaces. The memory 28 may include at least one program product, which has a set of (for example at least one) program modules configured to perform the functions of embodiments of the present disclosure.

A program/application 40 with a set of (at least one) program modules 42 may be stored in memory 28, the program modules 42 may include, but not limit to, an operating system, one or more application programs, other program modules and program data, and any one or combination of above examples may include an implementation in a network environment. The program modules 42 are generally configured to implement functions and/or methods described in embodiments of the present disclosure.

The electronic device 12 may also communicate with one or more external devices 14 (e.g., a keyboard, a pointing device, a display 24, and etc.) and may also communicate with one or more devices that enables a user to interact with the electronic device 12, and/or any device (e.g., a network card, a modem, and etc.) that enables the electronic device 12 to communicate with one or more other computing devices. This kind of communication can be achieved by the input/output (I/O) interface 22. In addition, the electronic device 12 may be connected to and communicate with one or more networks such as a local area network (LAN), a wide area network (WAN) and/or a public network such as the Internet through a network adapter 20. As illustrated in FIG. 7, the network adapter 20 communicates with other modules of the electronic device 12 over bus 18. It should be understood that although not shown in the figure, other hardware and/or software modules may be used in combination with the electronic device 12, which including, but not limited to, microcode, device drivers, redundant processing units, external disk drive arrays, RAID systems, tape drives, as well as data backup storage systems and the like.

The processing unit 16 can perform various functional applications and data processing by running programs stored in the system memory 28, for example, to perform the multi-image-based image enhancement method according to embodiments of the present disclosure.

Embodiments of the present disclosure provides a computer storage medium.

The computer storage medium of embodiments of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of carrier which carries a computer readable program code. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object-oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A material identification method based on laser speckle and modal fusion, comprising:
   performing data acquisition on an object by using a structured light camera for projecting laser speckles to obtain a color image, a depth image and an infrared image of the object;
   obtaining a color modal image, a depth modal image and an infrared modal image by processing the color image, the depth image and the infrared image with a processor;
   inputting, with the processor, the color modal image, the depth modal image and the infrared modal image into a preset depth neural network to train the preset depth neural network, to learn a material characteristic from a speckle structure and a coupling relation between color modal and depth modal, to generate a material classification model for classifying materials, and to generate a material prediction result in testing by the material classification model of the object;
   wherein obtaining the color modal image, the depth modal image and the infrared modal image by processing the color image, the depth image and the infrared image comprises:
   obtaining the color modal image by performing a backward mapping of bilinear interpolation on the color image in an infrared image space with a transformation matrix;
   obtaining the depth modal image by preprocessing the depth image through a range normalization method and an inverse-square method to obtain a preprocessed depth image and by up sampling the preprocessed depth image; and
   obtaining the infrared modal image by performing normalization on the infrared image.

2. The method according to claim 1, further comprising:
   performing the material identification using an optical signal, and identifying the object by a rendering model based on reflection and scattering characteristics of light on a surface of the object.

3. The method according to claim 2, wherein the rendering model is represented by:

$$L_o(x,\omega_o,\lambda,t)=\int_\Omega f_r(x,\omega_i,\omega_o,\lambda,t)L_i(x,\omega_i,\lambda,t)(\omega_i,n)d\omega_i,$$

where, $L_o(x,\omega_o,\lambda,t)$ represents radiant luminance of exiting ray having a wavelength exiting from a surface point x of the object along an exit direction $\omega_o$ at time t, which is an amount of energy, represented by an image, received by pixels corresponding to the exiting ray;
$L_i(x,\omega_o,\lambda,t)$ represents radiant luminance of incoming ray having the wavelength $\lambda$ incoming from the surface point x of the object along an incident direction $\omega_i$ at time t, $f_r(x, \omega_i, \omega_o, \lambda, t)$ represents, at time t, a ratio of exiting ray exiting from the surface point x along the exit direction $\omega_o$ to the incoming ray having the wavelength $\lambda$ that incomes along the incident direction $\omega_i$, and $(\omega_i, n)$ represents an inner product of the incident direction $\omega_i$, and a normal vector n of the surface point x of the object.

4. The method according to claim 1, wherein training the preset depth neural network comprises:
   training the preset depth neural network by using a cross entropy as a loss function and by means of small batch gradient descent to obtain the material classification model based on the modal fusion.

5. An electronic device, comprising:
   a processor; and
   a memory, having a computer program stored thereon,
   wherein, when the computer program is executed by the processor, the processor is configured to:
   receive a color image, a depth image, and an infrared image obtained via a structured light camera for projecting laser speckles by performing data acquisition on an object;
   obtain a color modal image, a depth modal image and an infrared modal image by processing the color image, the depth image and the infrared image;
   input the color modal image, the depth modal image and the infrared modal image into a preset depth neural network to train the preset depth neural network, to learn a material characteristic from a speckle structure and a coupling relation between color modal and depth modal, to generate a material classification model for classifying materials, and to generate a material prediction result in testing by the material classification model of the object;
   wherein the processor is configured to:
   obtain the color modal image by performing a backward mapping of bilinear interpolation on the color image in an infrared image space with the transformation matrix;
   obtain the depth modal image by preprocessing the depth image through a range normalization method and an inverse-square method to obtain a preprocessed depth image and by up sampling the preprocessed depth image; and
   obtain the infrared modal image by performing normalization on the infrared image.

6. The electronic device of claim 5, wherein the processor is further configured to:
   perform the material identification using an optical signal, and identify the object by a rendering model based on reflection and scattering characteristics of light on a surface of the object.

7. The electronic device of claim 6, wherein the rendering model is represented by:

$$L_o(x,\omega_o,\lambda,t)=\int_\Omega f_r(x,\omega_i,\omega_o,\lambda,t)L_i(x,\omega_i,\lambda,t)(\omega_i,n)d\omega_i,$$

where, $L_o(x,\omega_o,\lambda,t)$ represents radiant luminance of exiting ray having a wavelength $\lambda$ exiting from a surface point x of the object along an exit direction $w_o$ at time t, which is an amount of energy, represented by an image, received by pixels corresponding to the exiting ray; $L_i(x,\omega_i,\lambda,t)$ represents radiant luminance of incoming ray having the wavelength λ incoming from the surface point x of the object along an incident direction $\omega_i$ at time t, f, $(x,\omega_i,\omega_o,\lambda,t)$ represents, at time t, a ratio of exiting ray exiting from the surface point x along the exit direction $\omega_o$ to the incoming ray having the wavelength λ that incomes along the incident direction $\omega_i$, and ($\omega_i$, n) represents an inner product of the incident direction @ and a normal vector n of the surface point x of the object.

8. The electronic device of claim 5, wherein the processor is configured to train the preset depth neural network by:
   training the preset depth neural network by using a cross entropy as a loss function and by means of small batch gradient descent to obtain the material classification model based on the modal fusion.

9. A non-transitory computer readable storage medium, having one or more computer programs stored thereon, wherein when the one or more computer programs are executed by a processor, a material identification method based on laser speckle and modal fusion is executed, the method comprising:
   receiving a color image, a depth image, and an infrared image obtained via a structured light camera for projecting laser speckles by performing data acquisition on an object;
   obtaining a color modal image, a depth modal image and an infrared modal image by processing the color image, the depth image and the infrared image;
   inputting the color modal image, the depth modal image and the infrared modal image into a preset depth neural network to train the preset depth neural network, to learn a material characteristic from a speckle structure and a coupling relation between color modal and depth modal, to generate a material classification model for classifying materials, and to generate a material prediction result in testing by the material classification model of the object;
   wherein obtaining the color modal image, the depth modal image and the infrared modal image by processing the color image, the depth image and the infrared image comprises: obtaining the color modal image by performing a backward mapping of bilinear interpolation on the color image in an infrared image space with a transformation matrix;
   obtaining the depth modal image by preprocessing the depth image through a range normalization method and an inverse-square method to obtain a preprocessed depth image and by up sampling the preprocessed depth image; and
   obtaining the infrared modal image by performing normalization on the infrared image.

10. The non-transitory computer readable storage medium of claim 9, wherein the method further comprises:
   performing the material identification using an optical signal, and identifying the object by a rendering model based on reflection and scattering characteristics of light on a surface of the object.

11. The non-transitory computer readable storage medium of claim 10, wherein the rendering model is represented by:

$$L_o(x,\omega_o,\lambda,t)=\int_\Omega f_r(x,\omega_i,\omega_o,\lambda,t)L_i(x,\omega_i,\lambda,t)(\omega_i,n)d\omega_i,$$

where, $L_o(x,\omega_o,\lambda,t)$ represents radiant luminance of exiting ray having a wavelength λ exiting from a surface point x of the object along an exit direction $\omega_o$ at time t, which is an amount of energy, represented by an image, received by pixels corresponding to the exiting ray; $L_i(x,\omega_i,\lambda,t)$ represents radiant luminance of incoming ray having the wavelength λ incoming from the surface point x of the object along an incident direction $\omega_i$ at time t, f, $(x,\omega_i,\omega_o,\lambda,t)$ represents, at time t, a ratio of exiting ray exiting from the surface point x along the exit direction $\omega_o$ to the incoming ray having the wavelength & that incomes along the incident direction $\omega_i$, and ($\omega_i$, n) represents an inner product of the incident direction $\omega_i$ and a normal vector n of the surface point x of the object.

12. The non-transitory computer readable storage medium of claim 9, wherein training the preset depth neural network comprises:
   training the preset depth neural network by using a cross entropy as a loss function and by means of small batch gradient descent to obtain the material classification model based on the modal fusion.

* * * * *